F. BAIER.
ELECTRIC CONDUCTOR COUPLING.
APPLICATION FILED APR. 10, 1911. RENEWED JULY 27, 1914.
1,110,475.  Patented Sept. 15, 1914.
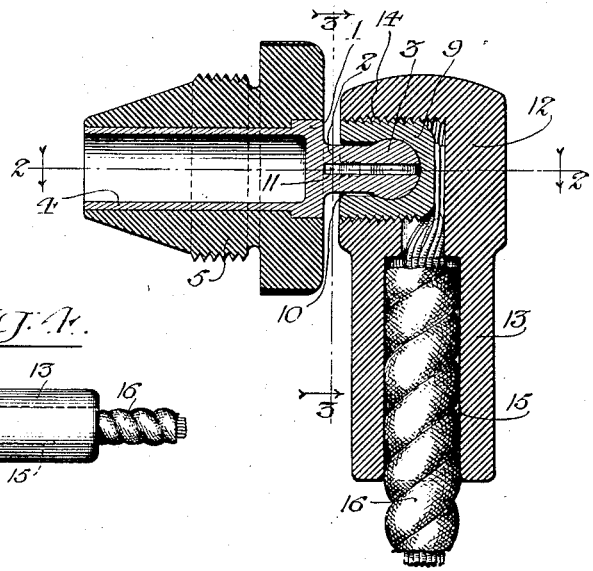
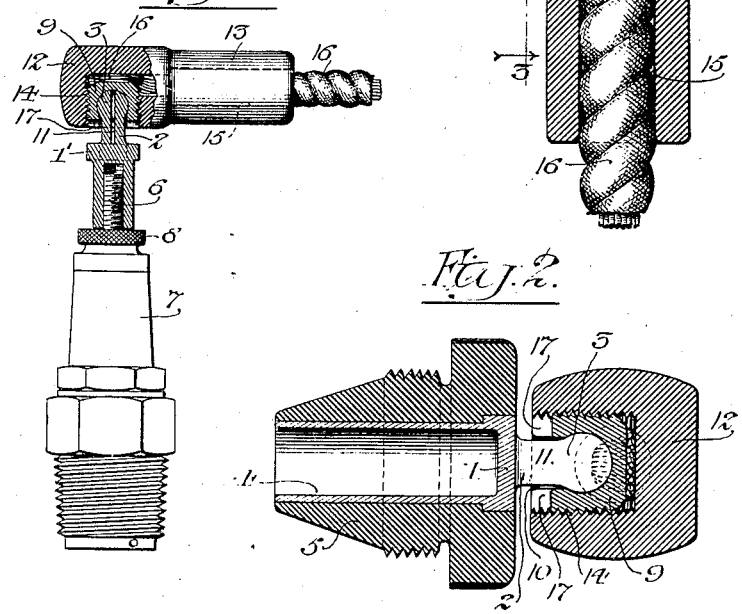
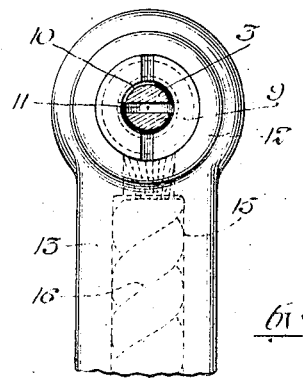
Witnesses:
Inventor:
Friedrich Baier

UNITED STATES PATENT OFFICE.

FREDRICK BAIER, OF CHICAGO, ILLINOIS, ASSIGNOR, BY MESNE ASSIGNMENTS, TO THE SWISS MAGNETO COMPANY, OF BUFFALO, NEW YORK, A CORPORATION OF NEW YORK.

ELECTRIC-CONDUCTOR COUPLING.

1,110,475.  Specification of Letters Patent.  Patented Sept. 15, 1914.

Application filed April 10, 1911, Serial No. 620,229. Renewed July 27, 1914. Serial No. 853,416.

*To all whom it may concern:*

Be it known that I, FREDRICK BAIER, a subject of the Emperor of Germany, and a resident of Chicago, county of Cook, and State of Illinois, have invented certain new and useful Improvements in Electric-Conductor Couplings, of which the following is a full, clear, and exact description.

The invention relates to couplings by which flexible electric conductors can be detachably connected to spark plugs, brush holders and the like, and seeks to provide a simple and effective construction by which the flexible conductor is securely connected to the coupling, both mechanically and electrically, and in which a secure mechanical and electrical connection is effected between the detachable coupling members.

The invention consists in the features of improvement hereinafter set forth, illustrated in the preferred form in the accompanying drawing and more particularly pointed out in the appended claim.

In the drawings, Figure 1 is a sectional view of the improved coupling as applied to a brush-holder. Fig. 2 is a sectional view on the line 2—2 of Fig. 1. Fig. 3 is a section on the line 3—3 of Fig. 1. Fig. 4 is a view similar to Fig. 1, showing the coupling applied to an igniter plug.

The improved coupling comprises detachable ball and socket members formed of brass or other suitable conducting material. The ball member consists of a base piece 1 and a projecting integral stem 2 which terminates in a spherical head 3. In the form shown in Figs. 1 and 2, the ball member is formed in piece with a cylindrical sleeve 4 which is adapted to serve as a holder for a carbon brush or the like. The sleeve 4 and the base piece 1 are embedded in a piece of insulated material 5 of hard rubber or the like, having screw threads or other suitable means by which it is held in position within a socket.

In the form shown in Fig. 4, the base portion 1' of the ball member is provided with an internally threaded bore for engaging the threaded stem 6 of the insulated electrode of an igniter plug 7. The bore of the base portion 1' is longer than the threaded stem 6, so that the ball member may be screwed in firm contact with the flange or shoulder 8.

The ball member of the coupling may be otherwise modified so that it may be attached to different parts.

The socket member 9 of the coupling comprises a short externally threaded plug having a seat or recess 10 extending inwardly from one end thereof and adapted to receive the ball member. The walls of the socket member 9 are unyielding and the outer portion or mouth of the recess 10 therein is smaller than its enlarged inner end. The head 3 of the ball member is slightly larger than the mouth of the recess and this head and the stem 2 of the ball member are provided with a longitudinal slit 11, so that the head 3 may be forced through the contracted mouth of the recess 10 into the enlarged inner end thereof. The two parts of the bifurcated ball member are quite rigid, but will yield slightly when the head portion 3 is forced through the contracted mouth of the recess or seat 10. By this construction a mechanically secure connection is afforded between the detachable ball and socket members of the coupling and good electrical contact is maintained between the same.

A holder formed of hard rubber or like insulating material is provided for the socket member 9 and for affording a connection between the flexible insulated conductor and the socket member. In the form shown, this holder comprises a head 12 and an integral hollow stem 13. A transversely disposed pocket 14 is provided in the head 12 and opens through a side face thereof. The socket member 9 is arranged within the pocket 14 and the walls of the latter are threaded to receive the external threads of the socket member.

The stem 13 of the insulating holder is provided with a longitudinal bore 15 which extends at right angles to the axis of the pocket 14 and is arranged to receive an insulated, flexible conductor 16. The inner end of the bore 15 is preferably reduced and opens into the pocket 14, adjacent the inner end thereof. The bared inner end of the insulating conductor extends through the reduced inner end of the bore 15 into the inner end of the pocket 14 and is clamped between the socket member 9 and the bottom wall of the pocket. The outer edge of the socket member is provided with kerfs 17 for receiving a screw-driver, so that the socket member may be forced into firm contact with the bared inner end of the conductor to thereby effect a good mechanical and electrical connection between the conductor and the socket member of the coupling.

It is obvious that the details set forth may be varied without departure from the essentials of the invention as defined in the claim.

I claim as my invention:—

An electric conductor coupling for spark plugs and the like comprising an elongated, insulating holder having a transversely disposed, internally threaded, closed-bottomed pocket at one end, and a longitudinal bore for receiving an insulated conductor extending inwardly from its opposite end, said bore having a reduced inner portion for the bared end of the conductor opening into the inner end of said pocket, a cylindrical, metallic socket member adjustably threaded into said pocket and having a flat, unobstructed, inner end face arranged to engage the bared end of the conductor and clamp the same against the bottom wall of said pocket and a ball member having a longitudinally split stem provided with an enlarged head detachably engaging said socket member, the walls of said socket member being solid and having a seat for said ball member enlarged at its inner end, substantially as described.

FREDRICK BAIER.

Witnesses:
 ELEANOR HAGENOW,
 KATHARINE GERLACH.